Figure 1:
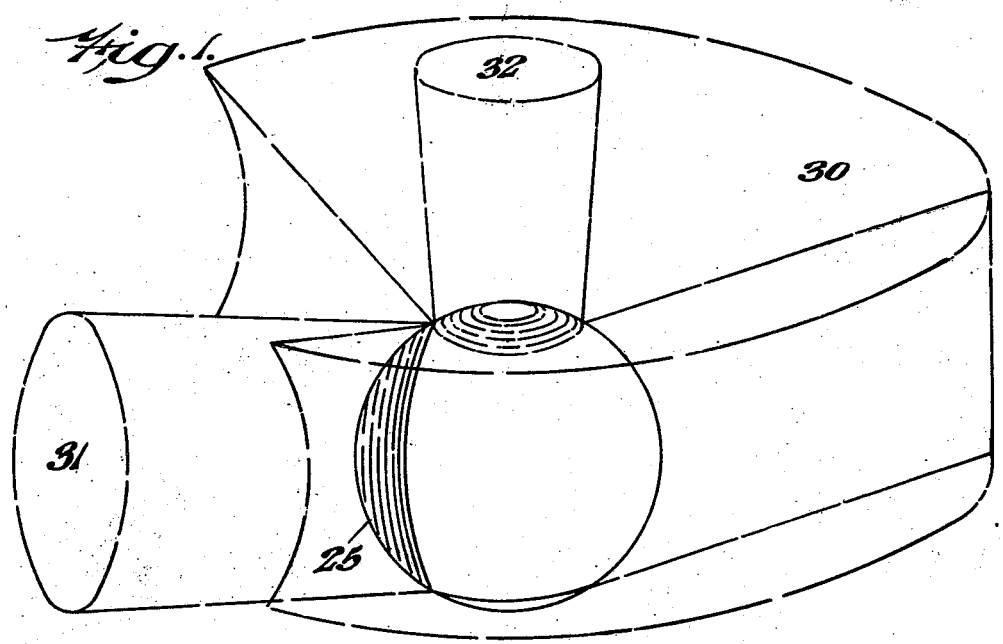

Oct. 15, 1935.   J. B. BARTOW   2,017,052
BEACON
Filed May 26, 1934    3 Sheets-Sheet 1

INVENTOR
JOHN B. BARTOW,
BY
Frank H. Borden
ATTORNEY

Oct. 15, 1935.   J. B. BARTOW   2,017,052
BEACON
Filed May 26, 1934   3 Sheets-Sheet 2

Fig. 3.

Fig. 4.

INVENTOR
JOHN B. BARTOW.
BY
Frank H. Borden
ATTORNEY

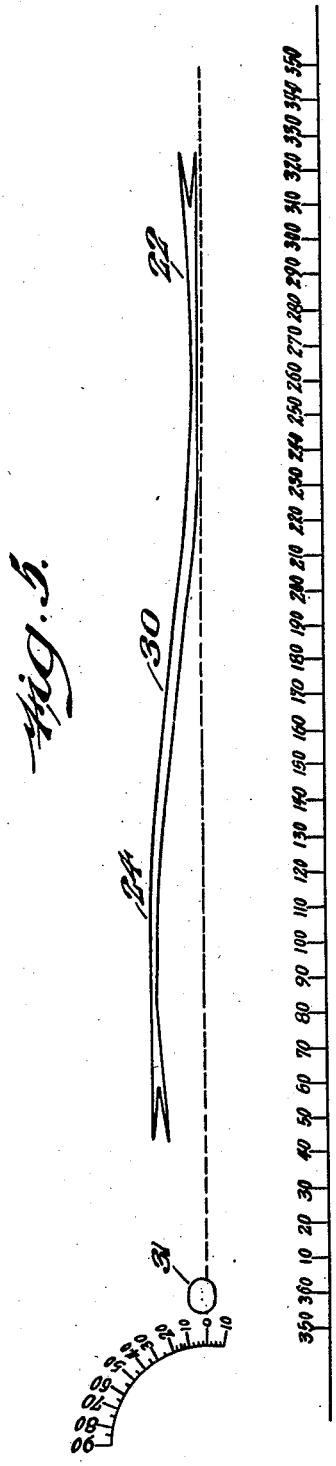

Patented Oct. 15, 1935

2,017,052

UNITED STATES PATENT OFFICE 2,017,052

BEACON

John B. Bartow, Blue Bell, Pa., assignor, by direct and mesne assignments, to Bartow Beacons, Inc., a corporation of Pennsylvania Application May 26, 1934, Serial No. 727,657

3 Claims. (Cl. 240—1.2)

This invention relates to beacons and particularly to beacons for aircraft.

In my Patent No. 1,834,041, dated December 1, 1931, I disclosed a rotatable beacon comprising a tilted optical system with a Fresnel lens such that the broad sheet or band of light emanating therefrom in a substantial plane was inclined relative to both the horizontal and to the vertical so that pilots of aircraft would be in some portion of the focused beam during rotation of the baacon regardless, substantially, of their angular direction from the beacon, provided that they were in the zone of angular dispersion thereof. This has proven to be valuable of itself, and this value has been enhanced by the interpolation into the substantial plane of light of a "pencil" beam from a "bull's-eye" lens. In certain cases it has been found undesirable to so arrange the beacon as to cause rays of the inclined beam to diverge below the horizontal, which result previously followed the tilting, unless the lowermost portion of the optical system was comprised of a reflector or other opaque element in place of a lens. The duration of flash on the horizontal has been found in some cases to be too short, and such as to warrant a prolongation that was difficult to obtain with a strictly planar beam.

In considering the desirability of beacons for various purposes and in connection with the various types now in use or proposed, it has been found that the high powdered "pencil" type of beam beacon when the pencil is the only beam, is not particularly satisfactory in fair weather, and it is practically useless when the weather "thickens". This has been thoroughly set out in the aforesaid patent and need not be repeated here.

In the beacon of the aforesaid patent there was an advantageous physiological feature in the provision of a plurality of visual "punches" imparted during each rotation, each being of a focused beam, so that the beacon was not "lost" by the pilot during rotation, this being assisted and facilitated by the presence of stray light surrounding the beacon, which was not present with conventional pencil type beacons.

It is among the objects of this invention; to provide improvements in the art of beacons; to improve the beacon disclosed in said earlier patent; to provide a substantially spherical beacon of manifold advantages; to provide a beacon which is substantially unaffected by wind resistance or by snow and the like; to provide a continuously rotating beacon arranged for use with the radiant energy of the sun during the daylight hours and with artificial light during the night; to provide a beacon of cheapness and economy of construction; to provide a beacon having a substantial or partial cone of light and which is inclined so that some portion of the cone of light extends substantially horizontally; to provide a substantial sphere of lenses as a beacon, with the lenses comprised of relatively easily molded segments arranged for quick and easy assembly; to provide a rotatable beacon with lenses such as to provide a flash of long duration at a predetermined level to provide a rotatable beacon with lenses such as to provide a flash of long duration on the substantial horizontal as a dash in spaced relation to a flash of short duration as a dot as components of a code signal utilizing a dot and a dash; to provide a rotatable beacon with lenses such as to provide at least a partial or functional cone of light certain rays of which have an acute angle relative to a perpendicular of the focal axis of the lens, and with the beacon inclined to the vertical by substantially the same angle so that during rotation a portion of said functional cone of light extends substantially horizontally; to provide a beacon conducing toward the use of a plurality of colors as signals in the beacon; to provide a beacon of light weight; to combine a beacon with a photoelectric device to control the artificial light; to reduce the power necessary to rotate the beacon; and many other objects and advantages, as will become more apparent as the description proceeds.

Figure 2:
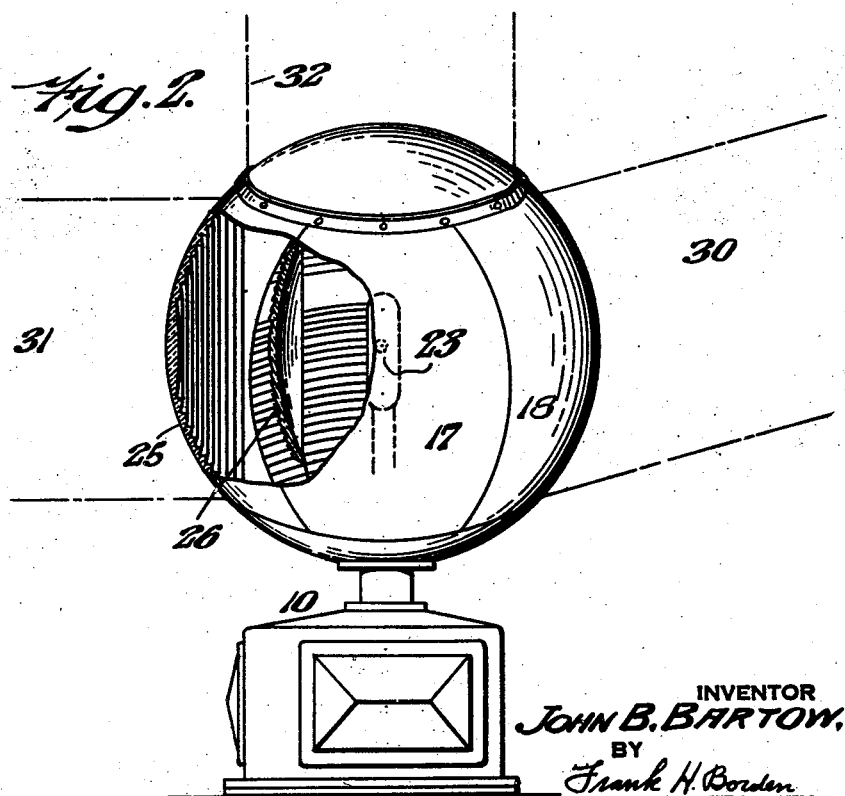

In the accompanying drawings forming part of this description;

Fig. 1 represents a diagrammatic perspective of the preferred form of beacon with the rays emanating therefrom disclosed as though cut off at a predetermined distance from the light source, to show the relative angularity of the several beams of the beacon, Fig. 2 represents a side elevation partially in section of a form of the invention, Fig. 3 represents a plan of a form of the beacon as it is inclined upon its rotatable support, Fig. 4 represents a vertical section through one form of the beacon of this invention, and Fig. 5 represents a diagrammatic graph or curve of the beam plotted against the angular rotation of the beacon and having ordinates in elevation.

Perhaps the simplest form of the beacon, by which certain of the advantages of the invention may well be secured, may be discussed in connection with Fig. 4. Referring then to that figure, a hollow rotatable support 10 is provided which is suitably journalled and driven as to cause rotation of the entire beacon at a predetermined and desired speed. The rotatable shaft or tube 10 has an axis of rotation 11. It will be assumed that a proper or desired degree of tilt for the broad light beam has been predetermined. This angle is obviously variable within wide limits according to various factors, including that of the desired vertical angle of sweep for the beam, as well as duration of the substantially horizontal component or portion of the beam. For illustrative purposes only it will be assumed that 15° has been determined to be best for the instant situation. The focal axis of the beacon, indicated at 12, will be inclined at substantially 15° relative to the rotative axis 11. In the usual case there will be provided a reflective base section or lower polar cap 13, mounted rigidly upon the rotative support 10 concentric with the focal axis 12, and obviously eccentric to the rotative axis 11. The base section 13 which may be of metal, etc., and comprises a segment or cap of the sphere 14 comprising the beacon. There may be and preferably there is, an opposite complemental segment or upper polar cap 15, concentric with the focal axis 12, and which usually and preferably comprises the "ceiling" light or bull's-eye lens, for projecting a substantially vertical beam for purposes already well known in the art and recited in the aforesaid patent. Obviously for certain beacon purposes the ceiling light may be omitted and its lens 15 may be replaced by a reflector polar cap element or by a mere metallic or other opaque closure.

In the illustrative form of beacon under discussion in connection with Fig. 4 the opposed cap segmental elements 13 and 15 provide a clearance for the insertion of a composite arcuate lens 16, comprising the equatorial segment of the sphere, such as to complete sphere 14. In the preferred form of equatorial lens 16 there will be provided a plurality of constituent lenses such as 17, 18, 20 and 21, and including in certain cases two additional lenses of similar characteristics as those to be described, in the event that a bull's eye or pencil type of beam is not to be provided, projecting horizontally. It is to be clearly understood that omission of such bull's-eye lens and the provision of a complete quasi or functional Fresnel lens is contemplated. Each of the lenses 17, 18, etc., comprising the arcuate segmental composite lens 16 is preferably of substantially 60° in equatorial arcuate extent and is properly shaped and proportioned as to fit into and complement adjacent lenses to become part of a sphere. The formation of the modified Fresnel lens achieved by these several component lenses is a relatively cheap proposition, in view of the relatively low cost of molding or forming the individual segments of the beacons, even in the case of those that are quite large.

In the conventional Fresnel lens as used in the aforesaid patent the rays emanating from the central light source were projected as a substantial plane of light. That is, the rays left the cylindrical lens in substantially perpendicular relation to the focal axis of the lens. The lenses of the instant invention are slightly modified Fresnel lenses and, as shown in Fig. 4, the outstanding characteristic of them is that the rays passing through the lens, while substantially in a plane are not exactly so, but are slightly inclined relative to the focal axis 12. That is the rays are slightly acutely angularly divergent from a perpendicular of the focal axis. While this inclination relative to and from the focal axis can be predetermined at any angle, yet, illustratively, the inclination may be 15°. Note that as regards lens 17, for instance, in Fig. 4, the rays indicated by dotted lines 22, emitted from the light source 23 at the focal point on the focal axis 12, extend at 75° approximately, to the focal axis, which is approximately at 15° to the normal of such axis, although, owing to the inclination of the entire beacon at 15°, the rays 22 happen to be normal to the axis of rotation 11, so to lie in a substantially horizontal plane. It will be clear that if all of the lenses in the equatorial segment 16 are similar, there will be an emission of a substantial cone of light, and that owing to the inclination of the beacon, while rays passing through lens 17 may extend horizontally, those passing through the diametrically opposite lens 21 will extend at substantially 30° to the horizontal as indicated by the dotted lines 24. The beam will be continuous and inclined from the horizontal to 30° above the horizontal, in this illustration.

It will be clear that the emitted light may comprise a partial or complete cone of light, or a modified or functional cone. Thus, in this latter case, assume the provision of a lens 17 as shown and described, in which the rays are bent at a predetermined angle relative to the focal axis, while the other lenses in the equatorial segment, or partial segment, are of standard Fresnel lens capable of emitting the substantially planar sheet of light in accordance with the aforesaid patent. In this case the inclination of the planar sheet will be incident to the inclination of the beacon while the light that might otherwise be directed below the horizontal is projected through a modified Fresnel as lens 17, to bend it toward the horizontal. The resulting band or sheet of light will not be a true cone necessarily, but will be a partial, a modified or a functional cone.

It will be clear that in constructing the substantially equatorial segment any combinations of Fresnel and modified or functional Fresnel lenses may be resorted to to secure predetermined effects, such as rays that are radial but which may vary in their angular relations to the focal axis with a plurality or multiplicity of projected angles.

In most cases, perhaps, it will be found preferably to include in the beacon a suitable bull's-eye lens as 25, the focal axis of which is normal to both the axis of rotation 11 and the focal axis 12, so that the emitted pencil type beam will be projected horizontally. Referring to Fig. 3 it will be observed that this bull's-eye lens 25 may comprise substantially 120° of the equatorial segment, although this may be varied in accordance with the desired effect in accordance with conditions. The arcuate extent of lens 16 also may vary through full 360° and such smaller arc as may just give an inclined beam from the horizontal toward some upper angle. Although lens 25 comprises in the preferred form sufficient area and arcuate extent as to complete the segment formed by lenses 17, 18, 20 and 21, yet it is preferred to utilize an inner converging lens 26 arranged to impart the first bend to the emitted light rays so that the light at the edges of the outer lens need not be diffused and lost as might be the case if the sharp bend otherwise necessary were resorted to. The result of the use of the primary converging or concentrating lens 26 is that there may be effected, a perceptible gap as at 27 and 28 in which there is no, or substantially no focussed emitted light, although there will still be strong stray light. It will be clear that to an observer during rotation of the beacon there will be an interruption in the beam marking a boundary of the conical or planar sheet and the pencil beam in each direction. This may be modified and diminished by suitable positioning and focusing of the lenses, but in most cases it is not considered detrimental.

The type of emissions derivable from the preferred form of beacon is diagrammatically indicated in Fig. 1, in that the light projected through the equatorial segment 16 comprises a cone or functional cone as indicated at 30, which, by the way, has a predetermined angle of spread. Thus beam 30, may have divergence between the upper and lower line of rays, of perhaps 6°. The pencil type of beam projected upon the horizontal as at 31 is indicated as having angularly divergent relation to the cone 30. The ceiling light beam 32 while substantially normal to the pencil beam 31 is substantially concentric with the cone 30, in the usual case. It will be understood that the beacon of Fig. 1 is to be inclined, although the showing is otherwise, and, of course, it is to be rotated. The beacon properly mounted and inclined toward the observer is shown in Fig. 2.

Referring to Fig. 5 there is disclosed diagrammatically the visual effect of the beacon of this invention according to a specification including a segmental lens assembly imparting a cone of light the rays of which extend upwardly from the lens at substantially 15° from the perpendicular of the focal axis with the beacon inclined substantially 15° from the axis of rotation, with substantially 6° spread of the conical beam, and having a pencil type or bull's-eye lens arranged in the periphery of the equatorial segment and arranged to project a pencil beam in a direction substantially concentric with an axis perpendicular to both the axis of rotation and the focal axis of the beacon. It might be noted in this connection that although this latter just mentioned disposition of the focal axis of the bull's-eye lens as perpendicular to both the rotative and the focal axes, of the beacon, yet it may equally well be, and is contemplated to be, simply substantially perpendicular to the axis of rotation so as to sweep the horizon, substantially, regardless of its disposition in the conical beam or in the equatorial lens system from which it emanates.

The abscissae of the chart or graph of Fig. 5 indicate the degrees of rotation of the beacon through a complete rotation. The ordinates are the degrees of elevation relative to the horizontal and relative to the beacon. At substantially 360°, that is through a band from perhaps 356°—4° there is found the flash 31 from the bull's-eye lens which is disposed in the graph in substantial alignment with the horizontal and is of relatively short duration such as to form a "dot" of a signal. Then, reading to the right, through the rotation of the beacon there is a dark area (relatively dark except for stray light), comprising the clearance space or gap 27 or 28 above noted. Then, at substantially 55° of beacon rotation, and approximately at 30° of elevation, depending upon the degree of spread as well as the predetermination secured by the tilting, etc., the light from the modified or actual Fresnel lens of the segment 16 will appear as two spaced points merging at about 70° in a solid band which, as the direction is to the right, with a continued rotation, gradually shifts downwardly toward the horizontal, so that beginning at approximately 230°, and extending through 310°, the beam is substantially on the horizon and is of relatively longer duration such as to form a "dash" of a signal, finally terminating substantially on the horizon at about 325° in another tongued or forked beam of about 15° length. It will be understood that the fork at the ends of the beam from the segmental lens 16 is incident to the use of lens elements which are segments of spheres, instead of the cylindrical lenses of the aforesaid patent. After the end or termination of the conical, compound or functionally conical beam, at approximately 325°, on the horizon there is another gap, or period of darkness incident to the passage of the complementary gap 27 or 28, after which there is the abrupt well defined kick or punch of the pencil type beam 31 at approximately 360°.

In the case just recited the pilot who is substantially on the horizon relative to the beacon, even though far distant, has a long interval of rotation of the beacon in which he is in the path of the portion of the conical beam that is disposed on the horizon, to locate same and to receive a perceptible kick therefrom. This being followed by a relatively short interval of darkness (which, however, is not "dark" owing to certain observable stray light) is followed by another flash or kick in the same generally horizontal direction, to furnish the decidedly advantageous effect of two timed flashes of different durations in each rotation.

The beacon as described has certain characteristics which are of high value. In the first place it is to be observed that all of the external lenses have the ridges and other recesses and the like formed on the internal surfaces so that the exterior is simply a smooth glass sphere, except as the joining seams may interrupt the continuity thereof. Then, owing to the provision of the enlarged spherical space, all lenses being spaced clear of the light source, it is quite easy to introduce color filters and the like so as to impart predetermined hues and combinations thereto various beams or parts of beams. This has a decided advantage in providing a beacon to comport with signal requirements as they are provided, or as they may be changed.

A feature of high interest is the fact that with the instant invention there has been provided a device capable of utilizing the sun's rays for useful signal and beacon purposes. It will be understood that the sphere of lenses provided and disposed upon a platform or other support is exposed to the rays of the sun. It will be understood that if rotation of the beacon is maintained during the daylight as well as during the night, there will be periodic flashes in all directions from the beacon, which will be due in part to the entry of the sun's rays through the lenses, their focusing or partial focusing by the lenses and the re-distributing or reflection thereof through the lenses again with excellent results. There also may be focusing of the sun's rays at various points within the sphere, and a consequent transmission through lenses, and reflection and refraction of the sun's rays from the facets and reflective faces of the various lenses. All to excellent advantage in a daylight beacon. While it will be understood that the flashing of the beacon as an incident of the sun's radiation on the beacon during its rotation may be somewhat irregular and even erratic during an entire rotation, having different characteristics with different peripheral areas of beacon as contrasted with the light beam emission from the light source in the beacon, yet the effect from any given point of observation or from any given angle of approach will be that of a substantially regular and uniform series of flashes, which latter only change in characteristics as the sun slowly changes its relative heavenly disposition.

It is preferred to provide a device (such for instance as a photo-electric device not shown) so arranged that the sun's radiant energy controls the artificial light source so as to cause it to turn on as the sun is relatively extinguished, and vice versa, while maintaining the rotation of the beacon. The use of the sphere as shown in connection with the external source of illumination is an important feature of the invention.

The various changes and modifications that may be resorted to without departing from the spirit of the invention will be obvious to those skilled in the art, and such are to be understood as within the scope of the invention recited in the appended claims.

I claim as my invention:

1. In a beacon, an annular lens system, means for rotating said system about a substantially vertical axis, the lens system comprising an equatorial segment arranged to project radially a relatively broad sheet of light substantially horizontally, of such arcuate extent as to form a dash component of a signal to an observer on the substantially horizontal, the lens system further comprising an equatorial segment arranged to project a pencil type of beam substantially on the horizontal of such arctuate extent as to form a dot component of a signal to such observer on the substantially horizontal, said lens system further comprising an equatorial segment arranged to project a relatively broad sheet of light inclined upwardly from the substantially horizontal so as to provide a flash to an observer above the horizontal within the vertical angular dispersion of the last mentioned sheet of light.

2. In a beacon, an annular lens system comprising a segment arranged to project a broad sheet of light substantially radially of the system inclined upwardly from the substantially horizontal, the lens system further comprising a segment arranged to project a broad sheet substantially on the horizontal, the lens system further comprising a segment arranged to project a pencil type beam substantially on the horizontal, the last two mentioned segments being arranged as to form a gap between the two beams on the substantially horizontal and to comprise to an observer on the substantially horizontal during rotation a signal incorporating a dash and a dot, the signal being terminated on one end by the vertical gap between the horizontally projected beam and the said upwardly inclined sheet of light, and the signal being terminated at the other end by the inclination of the said upwardly inclined sheet of light, and means for rotating the system.

3. In a beacon, an annular lens system, a light source, means for rotating the system on a substantially vertical axis, a segment of the system arranged to project a beam substantially radially of the system and of appreciable arcuate extent and which segment is so arranged relative to the light source as to project an appreciable portion of said beam on the substantially horizontal while the remainder of said beam is inclined upwardly from the horizontal as a broad sheet of light continuous with the sheet on the substantially horizontal, a segment of the system arranged to project a pencil type of beam from the light source on the substantially horizontal in spaced relation both to the broad sheet on the horizontal and to the upwardly inclined sheet emerging from the first mentioned segment, the arrangement of the lens system being such that during rotation the observer on the horizontal observes the broad horizontal sheet of light as a dash and the pencil type of beam as a dot, the dash and dot being components of a signal.

JOHN B. BARTOW.